United States Patent
Lee et al.

(10) Patent No.: US 7,330,366 B2
(45) Date of Patent: Feb. 12, 2008

(54) DC-AC CONVERTER

(75) Inventors: Chih-Chang Lee, Tainan County (TW); Lei-Ming Lee, Taoyuan County (TW)

(73) Assignee: DELTA Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 11/160,044

(22) Filed: Jun. 7, 2005

(65) Prior Publication Data

US 2006/0098461 A1    May 11, 2006

(30) Foreign Application Priority Data

Nov. 5, 2004   (TW) .............................. 93133756 A

(51) Int. Cl.
*H02M 7/00* (2006.01)
*H02M 3/335* (2006.01)

(52) U.S. Cl. .......................... 363/101; 363/17; 363/97

(58) Field of Classification Search ............ 363/15–17, 363/97, 98, 131, 132, 101; 323/222, 225
See application file for complete search history.

(56) References Cited

U.S. PATENT DOCUMENTS

| | | | | |
|---|---|---|---|---|
| 4,553,196 A * | 11/1985 | Tokuyama et al. | ....... | 363/21.04 |
| 5,095,261 A * | 3/1992 | Schoofs | ....................... | 323/222 |
| 5,179,508 A * | 1/1993 | Lange et al. | .................. | 363/16 |
| 6,154,473 A * | 11/2000 | Watanabe | ................ | 372/38.02 |
| 6,445,165 B1 * | 9/2002 | Malik et al. | ................. | 323/222 |
| 6,661,684 B2 * | 12/2003 | Morita | ........................ | 363/89 |
| 6,804,129 B2 * | 10/2004 | Lin | .............................. | 363/98 |
| 7,009,852 B2 * | 3/2006 | Ying et al. | ..................... | 363/17 |
| 7,061,212 B2 * | 6/2006 | Phadke | ........................ | 323/222 |

\* cited by examiner

*Primary Examiner*—Gary L Laxton
(74) *Attorney, Agent, or Firm*—Jianq Chyun IP Office

(57) ABSTRACT

A DC-AC converter is applicable for transforming direct current (DC) to alternating current (AC). The DC-AC converter includes a voltage boost module and a DC-AC converter module. Herein the voltage boost module includes a voltage bypass circuit and a voltage boost circuit, both of which receive input voltage from DC input power. Meantime, the voltage bypass circuit sends out the received input voltage, and the voltage boost circuit will operate to increase DC output voltage from the DC input as the DC output voltage from the voltage bypass circuit is not high enough to meet requirement by AC output power. The DC-AC converter module receives the output voltage from the voltage boost module and converts the received voltage to the required AC output power.

9 Claims, 5 Drawing Sheets

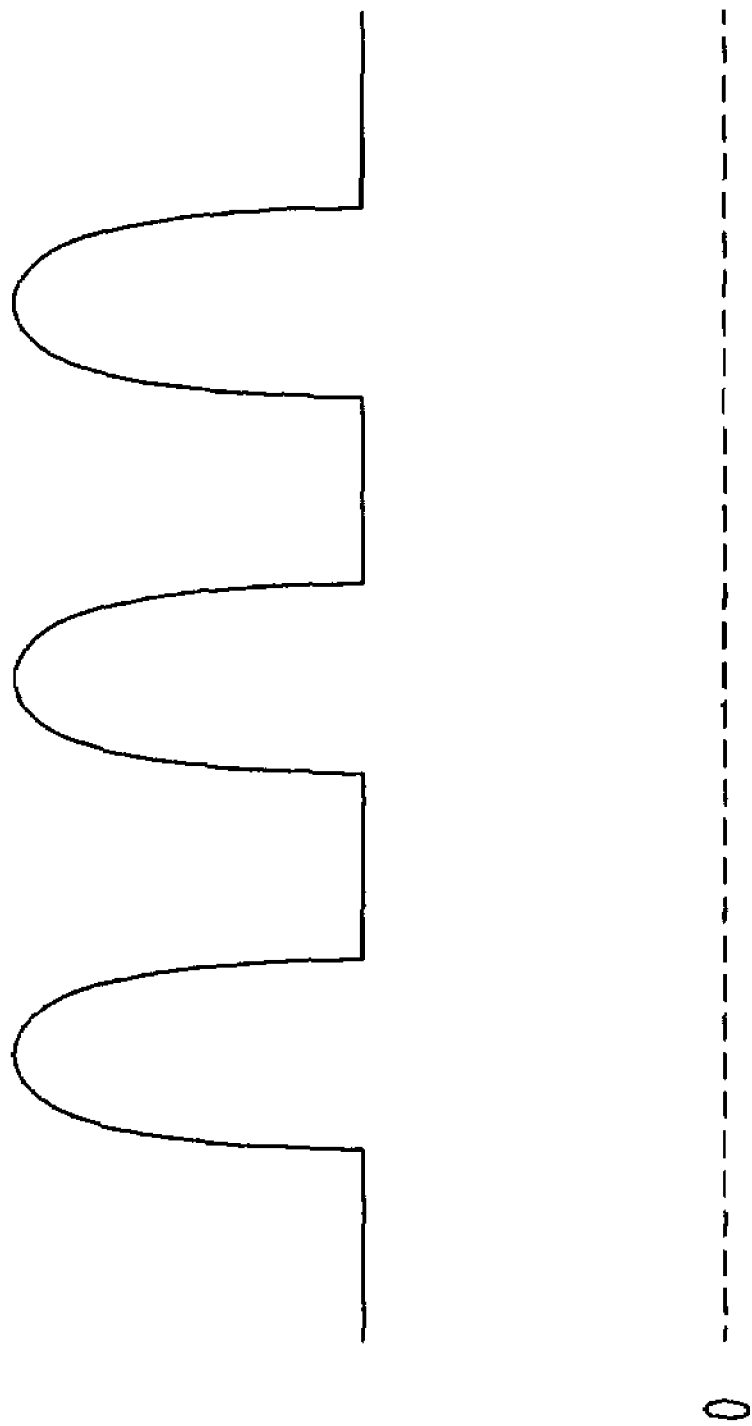

DC-AC CONVERTER

CROSS-REFERENCE TO RELATED APPLICATION

This application claims the priority benefit of Taiwan application serial no. 93133756, filed on Nov. 5, 2004. All disclosure of the Taiwan application is incorporated herein by reference.

BACKGROUND OF THE INVENTION

1. Field of Invention

The present invention relates to an electric converter. More particularly, the present invention relates to a DC-AC converter.

2. Description of the Prior Art

A structure of DC-AC converter of the conventional art applicable to the situation with input voltage in large range is illustrated in FIG. 1, wherein the DC-AC converter 100 includes a stage-1 voltage boost circuit 102, a stage-2 DC-DC converter 104 and a stage-3 DC-AC converter 106.

Therein, the stage-1 voltage boost circuit 102 is comprised by a DC input power 108, an inductor 110, a transistor switch 112, a diode 114 and a capacitor 116. The stage-1 voltage boost circuit 102 boosts its voltage to a level required by output end by means of pulse width modulation (PWM) operation of the transistor switch 112, and has effect to keep voltage stabilized.

The stage-2 DC-DC converter 104 is connected to an output end of the stage-1 voltage boost circuit 102 and comprises a primary control circuit 152, a voltage transformer 126 and a secondary control circuit 154.

And, the stage-2 DC-DC converter 104 receives a DC power voltage boosted by the stage-1 voltage boost circuit 102, and then delivers the output voltage from the stage-1 voltage boost circuit 102 to the primary winding of the voltage transformer 126 by means of ON/OFF operations of transistor switches 118, 120, 122 and 124 in the primary control circuit 152. Further, the voltage transformer 126 delivers the received voltage to a rectifier formed by diodes 128, 130, 132 and 134. The received voltage is also transmitted to a filter formed by a first inductor 136 and a first capacitor 138, wherefrom the output is sent to the stage-3 DC-AC converter 106.

The following stage-3 DC-AC converter 106 is coupled with the output end of the stage-2 DC-DC converter 104, comprising transistor switches 140, 142, 144, 146, an inductor 148 and a capacitor 150, and converts the received DC power voltage to AC power voltage forwarding to a load terminal by means of switching operations of transistor switch 140, 142, 144 and 146, and also by a second the filter. The second filter includes a second inductor 148 and a second capacitor 150. In the application of a conventionally known DC-AC converter with its input voltage in a large range, the input DC power voltage must be boosted to its maximum extent by the stage-1 voltage boost circuit and kept stabilized. Thereafter it is transmitted by the voltage transformer to the stage-3 DC-AC converter, wherein the DC power voltage is converted to an AC power voltage needed by the load terminal.

In summary, there are the following shortages for the conventional DC-AC converter in application for a situation with the input voltage in the large range:

1. No matter how the AC power voltage is high or low required by an output end, the DC input power voltage in stage-1 voltage boost circuit must be boosted to its highest voltage. Consequently, the components thereof must be operated or switched in the condition with a high voltage, resulting in energy consumption.

2. The converting structures of three stages are required in it, which causes an increasing energy loss and reduces a converting efficiency.

3. And two sets of heavy reservoir capacitors are employed for its configuration, leading to an increase of cost which doesn't meet economically saving consideration.

SUMMARY OF THE INVENTION

It is an object of the invention to provide a DC-AC converter applicable for converting a DC input power to an AC output power and regulating a DC input voltage to a just level required by output to effectively reduce energy loss during the DC-AC converter's operation. Also, heavy reservoir capacitors are saved to reduce the cost and increase the converting efficiency.

The present invention provides a DC-AC converter for applications, which comprises a voltage boost module, a DC-AC converting module and a feedback module, wherein the voltage boost module comprises a voltage bypass circuit and a voltage boost circuit. These two circuits are used for receiving DC input voltage from the DC input power, and the voltage bypass circuit conveys the received DC input voltage directly to the DC-AC converting module.

The voltage boost circuit is on duty if the DC output voltage from the voltage bypass circuit is insufficiently high to meet a need for an AC output voltage level. Hereupon, the voltage boost circuit receives the input DC voltage, and boosts this voltage sent to DC-AC converting module wherein the received DC is converted to the required AC output power.

In accordance with the preferred embodiment's description, the foregoing voltage bypass circuit includes a diode, which is electrically coupled with a DC input power at an end and with a capacitor at another end of the diode.

In accordance with the description of another preferred embodiment of DC-AC converter, the above-mentioned feedback module determines a required value of voltage provided by the voltage boost circuit based on the difference between the output voltage level from DC-AC converting module and the preset value.

In the present invention, due to the utilization of the voltage bypass circuit, if the DC input voltage is high enough to provide AC output power, the voltage boost circuit is not in action and the DC input is transferred to the DC-AC converting module via the voltage bypass circuit. On the contrary, when the DC input voltage is not high enough to provide AC output power, the voltage boost circuit starts to work and regulates the DC input voltage to a level required by output to effectively reduce energy loss during the DC-AC converter's operation. Also and, the high-capacity capacitors can be saved, resulting in saving cost and improvement of the converting efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2B is a drawing, schematically showing the waveform of output voltage measured at an end of reservoir capacitors after the DC input power voltage is boosted by the voltage boost circuit in a DC-AC converter, according to an embodiment of the invention.

DESCRIPTION OF EMBODIMENTS

Figure 1:
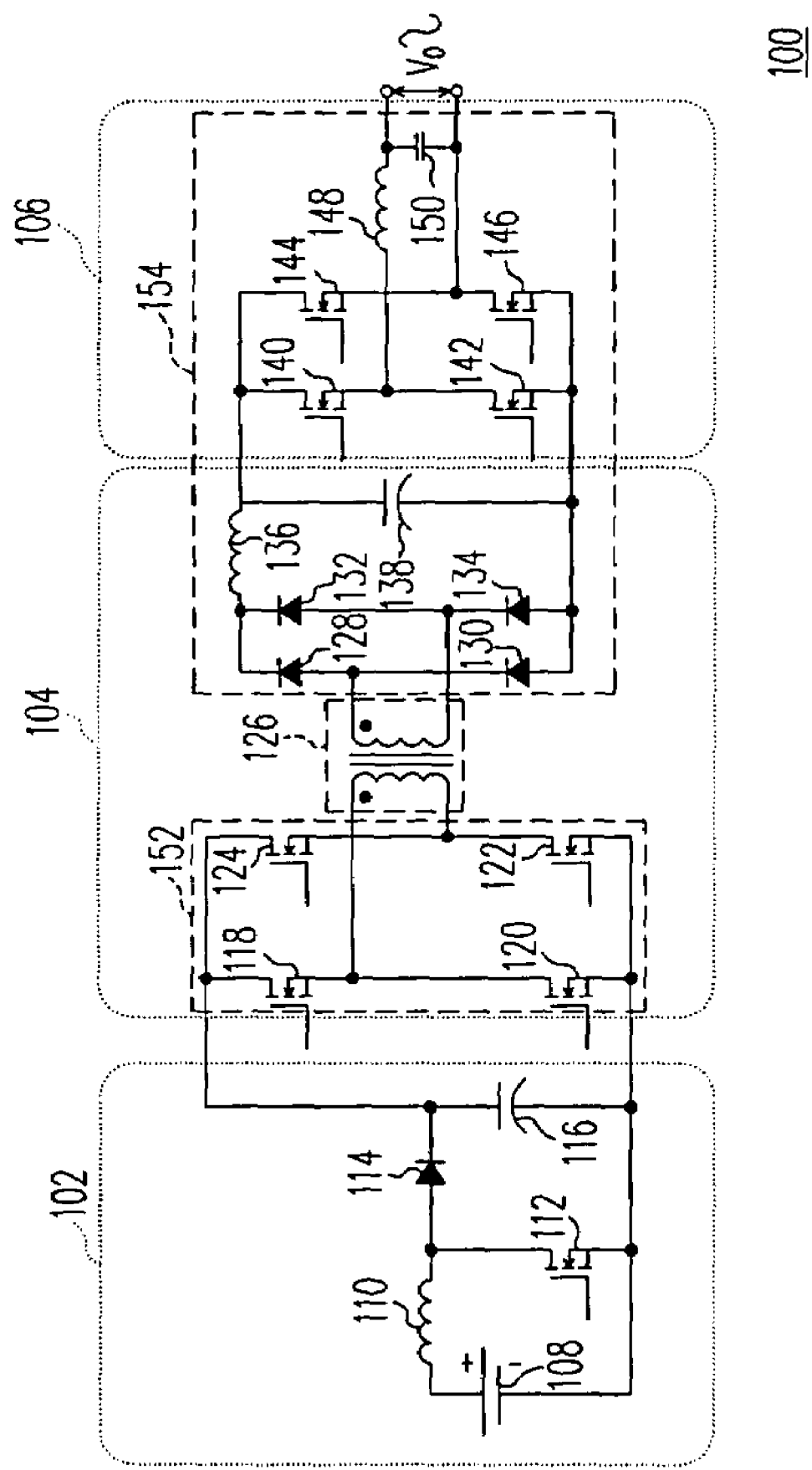
FIG. 1 is a drawing, schematically showing a conventional DC-AC converter.
Figure 2A:
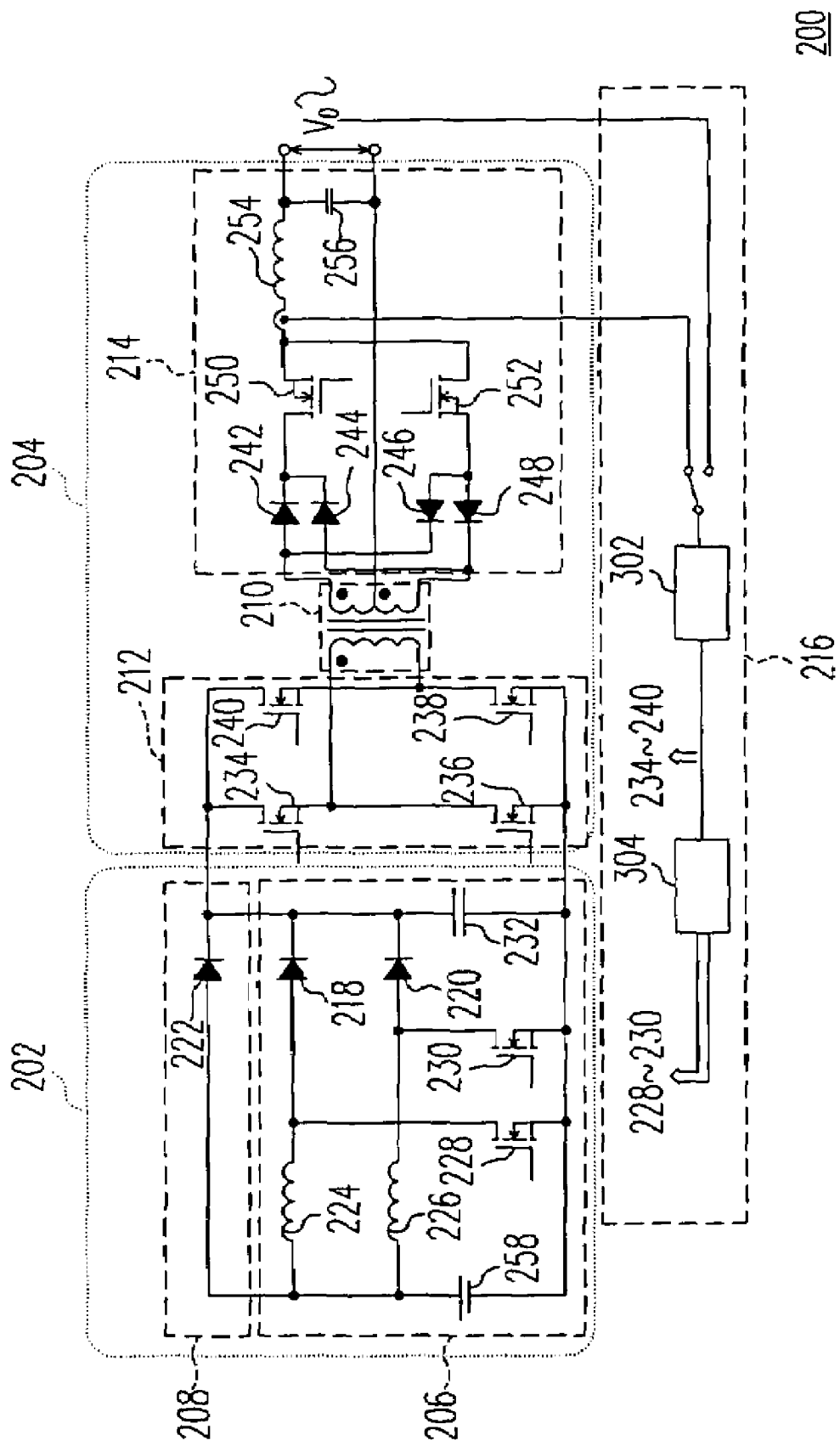
FIG. 2A is a drawing, schematically showing a DC-AC converter, according to an embodiment of the invention.
Figure 3:
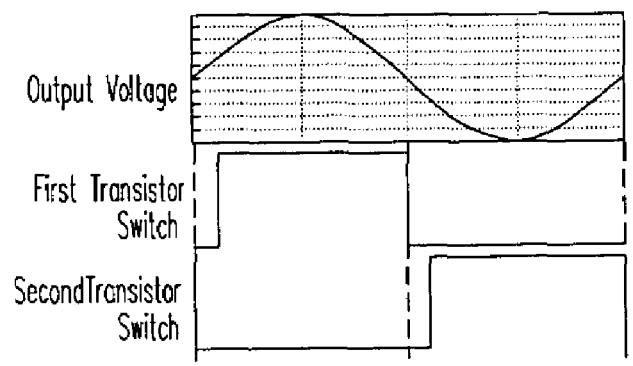
FIG. 3 is a drawing, schematically showing the output voltage in a DC-AC converter and the switching waveforms of the first transistor switch and the second transistor switch in a secondary control circuit respectively, according to an embodiment of the invention.
Figure 4:
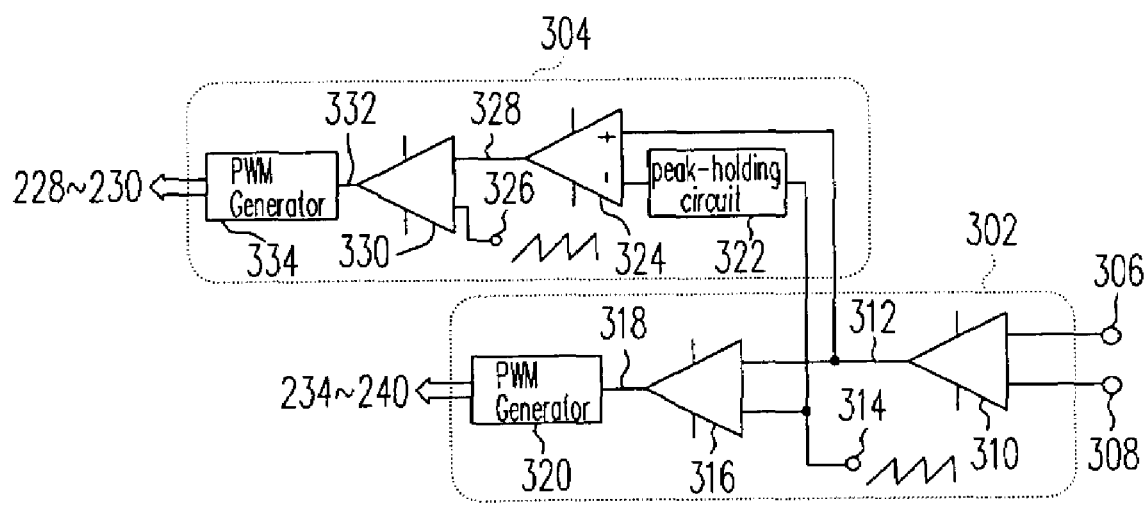
FIG. 4 is a block diagram, schematically showing a feedback module in a DC-AC converter, according to an embodiment of the invention.

FIG. 2A is a circuit diagram of a DC-AC converter, according to an embodiment of the invention, wherein the DC-AC converter includes a voltage boost module 202, a DC-AC converting module 204 and a feedback module 216.

The voltage boost module 202 of the embodiment includes a voltage bypass circuit 208 and a voltage boost circuit 206. Here the voltage boost circuit 206, in fact, can be seen as a dual voltage boost circuit, which includes inductors 224 and 226, diodes 218 and 220, a capacitor 232, a first transistor switch 228 and a second transistor switch 230.

Wherein, one end of each of the inductors 224 and 226 is coupled with the positive end of a DC input power 258, and another end thereof is coupled with the node between diodes 218 and 220. One end of the first transistor switch 228 is coupled with the common end of the inductor 224 and the diode 218, and the other end thereof is coupled with the common end of the capacitor 232 and the DC input power 258.

The capacitor 232 is coupled, at its one end, with the common end of diode 218 and 220, but at its another end is coupled with the negative end of DC input power 258. Fourthly, one end of the second transistor switch 230 is coupled with the common end of inductor 226 and diode 220, and another end thereof is coupled with the node between the capacitor 232 and the DC input power 258.

In the voltage boost circuit 206 of the embodiment, the inductor 224, the diode 218 and the first transistor switch 228 can be removed and only the inductor 226, the diode 220 and the second transistor switch 230 are used. In this manner, it becomes a single voltage boost circuit which functions same as the dual voltage boost circuit for boosting the DC output voltage to the required amount and keeping voltage stabilized.

A voltage bypass circuit 208 includes diode 222, one end of which is connected with the positive end of the DC input power 258, and the another end is connected with one end of the capacitor 232.

In the embodiment, when the DC voltage, after delivering via the voltage bypass circuit 208, is high enough to supply AC output end, the transistor switches 234, 236, 238 and 240 in the primary control circuit 212 start to make PWM switching in the DC-AC converting module 204 of the embodiment, and the voltage boost circuit 206 is not on duty. By means of diode 222 in the voltage bypass circuit 208, the voltage boost module 202 carries DC voltage directly from the DC input power and turns over it as DC output power to DC-AC converting module 204, whereby an AC with the voltage required by output is converted.

As the voltage transferred by the voltage bypass circuit 208 from DC input power 258 is high enough to supply AC output end, the transistor switches 234, 236, 238 and 240 in the primary control circuit 212 of DC-AC converting module 204 is by PWM control to generate a proper voltage level for AC output.

Therefore, the voltage boost circuit 206 is not on duty at this stage. Also, the voltage boost module 202 continues to carries DC voltage, by the diode 222 of voltage bypass circuit 208, directly from the DC input power and turns over it as DC output power to the DC-AC converting module 204, whereby an AC voltage with the voltage required by output is converted.

As the output power of the voltage bypass circuit 208 output from the DC input power is not high enough to supply the preset output voltage level, it indicates that the transferred DC output voltage is not high enough to meet a need for the output end. Meanwhile, the transistor switches 234, 236, 238 and 240 in the primary control circuit 212 of the DC-AC converting module 204 keep their duty cycles to the maximum extent. Thus, the first transistor switch 228 and the second transistor switch 230 starts to make PWM switching. Then, the DC voltage from DC input power 258 is, by means of the voltage boost circuit 206, boosted to an amount required by output. FIG. 2B is a drawing, schematically showing the waveform of output voltage measured at the output end of capacitor 232 after the DC input power voltage is boosted by the voltage boost circuit.

The DC-AC converting module 204 in the embodiment is comprised of a voltage transformer 210, the primary control circuit 212 and a secondary control circuit 214, wherein the voltage transformer 210 includes a primary winding and a secondary winding. The output voltage at the secondary winding is determined by the provided voltage at the primary winding.

In this embodiment, the primary control circuit 212 is electrically coupled between the voltage boost module 202 and the primary winding of the voltage transformer 210. The primary control circuit 212 includes the first transistor switch 234, the second transistor switch 236, the third transistor switch 238 and the fourth transistor switch 240.

Figure 6:
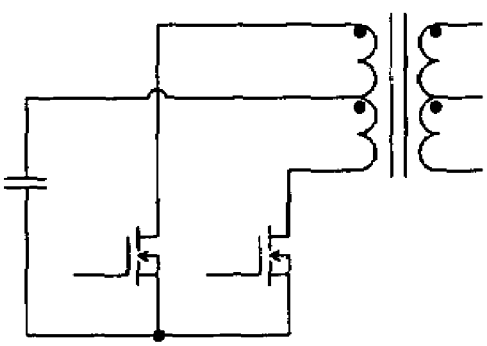
FIG. 6 is a drawing, schematically showing an alternative of the primary control circuit in a DC-AC converter, according to an embodiment of the invention.

The one end of the first transistor switch 234 is coupled with one end of the second transistor switch 236 and one end of the primary winding of the voltage transformer 210. Another ends of the first transistor switch 234 and the second transistor switch 236 are coupled with two output ends of voltage boost module 202. And, the one end of the third transistor switch 238 is coupled with one end of the fourth transistor switch 240 and another end of the primary winding of the voltage transformer 210. Further, another ends of the third transistor switch 238 and the fourth transistor switch 240 are coupled with two output ends of the voltage boost module 202. Alternatively, the above-mentioned primary control circuit 212 can be substituted by a DC-DC converter with a similarly function, referring to FIG. 6.

Figure 5:
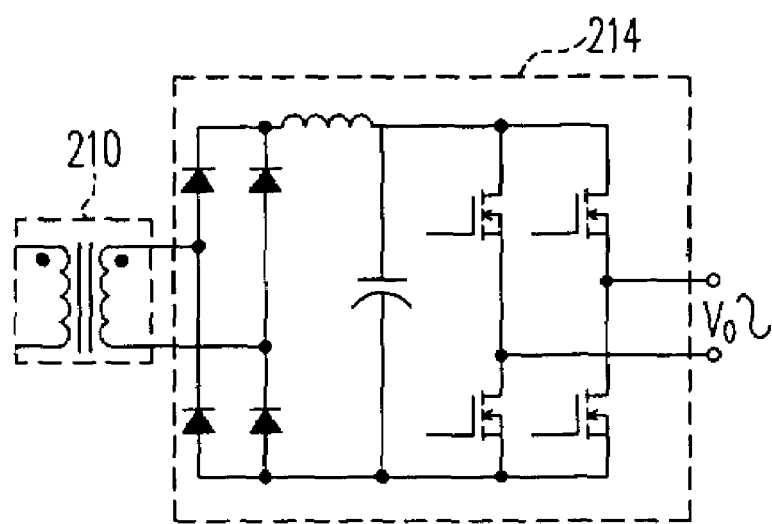
FIG. 5 is a drawing, schematically showing an alternative of the secondary control circuit in a DC-AC converter, according to an embodiment of the invention.

The secondary control circuit 214 in the embodiment is connected with the secondary winding of voltage transformer 210, wherefrom the output voltage is received and converted to the AC output power voltage to meet a need for the output. Alternatively, the above-mentioned secondary control circuit 214 can be substituted by the circuit shown in FIG. 5 with a same function.

In the above-described DC-AC converting module 204, the PWM operation with the transistor switches of the primary control circuit 212 allows the voltage to be transferred from the voltage boost module 202 to the primary winding of the voltage transformer 210, the transferred voltage goes further to the secondary control circuit 214 via windings of the voltage transformer 210, then across a rectifier formed by diodes 242, 244, 246 and 248, and starts a DC-AC converting by means of the first transistor switch 250 and the second transistor switch 252.

As the AC output voltage takes positive half-cycle, the first transistor switch 250 is conducted. Instead, as the AC output voltage takes negative half-cycle, the second transistor switch 252 is conducted. And, the switching frequencies of the first transistor switch 250 and the second transistor switch 252 are the same as the one of output voltage. As a result, the AC voltage goes through a filter, formed by an inductor 254 and a capacitor 256, exports the AC output power needed by load.

The feedback module 216 in the embodiment includes a first controller 302 and a second controller 304. The first controller 302 has a first error compensator 310, a first comparator 316 and a first PWM signal generator 320. Wherein, the first error compensator 310 is to compare a feedback signal 306 from the DC-AC converting module 204 with the reference signal 308. Besides, it gives out the first error compensating signal 312 to an input end of the first comparator 316 which makes a comparison between a first sawtooth waveform signal 314 and the first error compensating signal 312, and gives out the first comparison signal 318 into the first PWM signal generator 320.

The second controller 304 includes a peak-holding circuit 322, a first subtractor 324, a second comparator 330 and a second PWM signal generator 334. Wherein, the peak-holding circuit 322 is to receive the first sawtooth waveform signal 314 and to hold the peak voltage thereof. The first subtractor 324 is to receive the first error compensating signal 312 from the first error compensator 310 and the output signal value from the peak-holding circuit 322. The resulting signal by subtraction operation is then sent to an input end of the second comparator 330, where the resulting signal of the subtraction 328 and a second sawtooth waveform signal are compared with each other, and a second comparison signal 332 is given out into the second PWM signal generator 334.

In the embodiment, as DC voltage is high enough to supply a voltage needed by at the output end, the first transistor switch 228 and the second transistor switch 230 in the voltage boost circuit keep at off status according to the feedback signal from the second controller 304 of the feedback module 216. At this moment, the inputting DC voltage is transferred to the DC-AC converting module 204 via the voltage bypass circuit 208. The feedback signal 306 (current signal or voltage signal) from DC-AC converting module 204 is compared with the reference signal 308 in the first error compensator 310 located in the first controller 302 of feedback module 216, then the first error compensating signal 312 is sent out to an input end of the first comparator 316.

And, the first comparator 316 serves to compare the first sawtooth waveform signal 314 with the first error compensating signal 312 for outputting the first comparison signal 318 to the first PWM signal generator 320. The first PWM signal generator 320 is based on the first comparison signal 318 to generate PWM signals to control the transistor switches 234, 236, 238 and 240 in the primary control circuit 212 for PWM.

When the inputting DC voltage is not high enough to supply the AC voltage needed at the output end, the feedback current signal or the voltage signal 306 from DC-AC converting module 204 is compared with reference signal 308 via the first error compensator 310 of the feedback module 216, then the first error compensating signal 312 is exported to an input end of the first comparator 316.

The first comparator 316 serves to compare the first sawtooth waveform signal 314 with the first error compensating signal 312 for outputting the first comparison signal 318 to the first PWM signal generator 320. The first PWM signal generator 320 is based on the first comparison signal 318 to generate the outputting signals to control the transistor switches 234, 236, 238 and 240 in primary control circuit 212 for keeping their duty cycles to maxim extent.

In this instance, the voltage boost circuit 206, according to the peak-holding circuit 322 of the controller 304, is to receive the first sawtooth waveform signal 314 and to hold the peak value of the sawtooth waveform signal 314. The first subtractor 324 is to subtract the first error compensating signal 312 by the output signal value from the peak-holding circuit 322, and send the resulting signal of subtraction 328 to an input end of the second comparator 330.

The second comparator 330 serves to compare the resulting signal of subtraction 328 with the second sawtooth waveform signal 326 for giving out the second comparison signal 332 to the second PWM signal-generator 334. The second PWM signal generator 334 is based on the second comparison signal 332 to generate the outputting wave signal to control the operation of voltage boost circuit 206. As a result, the first transistor switch 228 and the second transistor switch 230 start the switching operation for PWM and convert the DC input voltage to an AC output power required by the output end.

In summary from above-described, the present invention can effectively reduce energy loss during operation of the DC-AC converter. Also and, the high-capacity capacitors can be saved, resulting in saving cost and improvement of the converting efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A DC-AC converter, suitable for converting a DC input power to an AC output power, comprising:
   a voltage boost module, having a voltage bypass circuit and a voltage boost circuit, the voltage bypass circuit and the voltage boost circuit receiving an input voltage from the DC input power, and the voltage bypass circuit transferring the input voltage for a DC output voltage, and the voltage boost circuit being enabled to boost the input voltage to its output voltage when the DC output voltage transferred by the voltage bypass circuit is not high enough to meet a need for an AC output voltage level;
   a DC-AC converting module, receiving the output voltage from the voltage boost module and converting the received voltage into the required AC output power;
   a voltage transformer, having a primary winding and a secondary winding, wherein an output voltage value at the secondary winding is determined by a provided voltage value at the primary winding;

a primary control circuit, electrically coupled with both of the voltage boost module and the primary winding, the primary control circuit having a plurality of switches and, based on an ON/OFF status of the switches, transferring the voltage received by the voltage boost module to the primary winding;

a secondary control circuit, electrically coupled to the secondary winding and transferring the voltage received from the secondary winding to the required AC output power; wherein the primary control circuit comprises: a first switch and a second switch, one end of the first switch coupled with one end of the second switch and the primary winding, and another ends of the first switch and the second switch respectively coupled with output ends of the voltage boost module; and a third switch and a fourth switch, the third switch coupled with ends of the fourth switch and the primary winding, and another ends of the third switch and the fourth switch respectively coupled with output ends of the voltage boost module; and a feedback module, wherein the feedback modules decides a required voltage value by the voltage boost circuit based on a difference between an output from the DC-AC converting module and a preset value and wherein the feedback module comprises:
 a first error compensator, comparing the output of the DC-AC converting module with the preset value and giving out a first error compensating signal;
 a first comparator, comparing a first sawtooth waveform signal with the first error compensating signal and giving out a first comparison signal;
 a first PWM signal generator, according to the first comparison signal, generating an outputting wave signal to control operations of the first switch, the second switch, the third switch and the fourth switch;
 a peak-holding circuit, receiving the first sawtooth waveform signal and holding a peak value thereof;
 a first subtractor, subtracting the first comparison signal by the output signal value from the peak-holding circuit, and obtaining a resulting signal of subtraction;
 a second comparator, comparing the resulting signal of subtraction with a second sawtooth waveform signal and exporting a second comparison signal; and
 a second PWM signal generator, according to the second comparison signal, generating an output wave signal to control operations of the voltage boost circuit.

2. The DC-AC converter as claimed in claim 1, wherein said voltage bypass circuit includes:
 a switch, one end of the switch coupled with one end of the DC input power, and another end of the switch coupled with one end of a capacitor, and another end of the DC input power coupled with another end of the capacitor.

3. The DC-AC converter as claimed in claim 2, wherein said switch includes a diode.

4. The DC-AC converter as claimed in claim 1, wherein said voltage boost circuit comprises:
 an inductor, one end of the inductor coupled with an end of the DC input power;
 a first switch, one end of the first switch coupled with another end of the inductor;
 a capacitor, coupled with another end of the first switch and another end of the DC input power; and
 a second switch, one end of the second switch coupled with a common end of the inductor and the first switch, another end of the second switch coupled with a common end of the capacitor and the DC input power.

5. The DC-AC converter as claimed in claim 4, wherein said first switch includes a diode.

6. The DC-AC converter as claimed in claim 4, wherein said second switch includes a transistor.

7. The DC-AC converter as claimed in claim 1, wherein each of the first switch, the second switch, the third switch and the fourth switch includes a transistor respectively.

8. The DC-AC converter as claimed in claim 1, wherein said secondary control circuit includes a full bridge type rectifier.

9. The DC-AC converter as claimed in claim 1, wherein said secondary control circuit includes a half-bridge rectifier.

* * * * *